(12) United States Patent
Matsumoto et al.

(10) Patent No.: US 9,771,266 B2
(45) Date of Patent: Sep. 26, 2017

(54) METHOD AND APPARATUS FOR PROCESSING CARBON NANOTUBES

(71) Applicant: TOKYO ELECTRON LIMITED, Minato-ku (JP)

(72) Inventors: Takashi Matsumoto, Tsukuba (JP); Osayuki Akiyama, Kikuchi-gun (JP)

(73) Assignee: TOKYO ELECTRON LIMITED, Minato-ku (JP)

( * ) Notice: Subject to any disclaimer, the term of this patent is extended or adjusted under 35 U.S.C. 154(b) by 261 days.

(21) Appl. No.: 14/745,665

(22) Filed: Jun. 22, 2015

(65) Prior Publication Data

US 2015/0291425 A1 Oct. 15, 2015

Related U.S. Application Data

(60) Division of application No. 14/176,197, filed on Feb. 10, 2014, now abandoned, which is a continuation of
(Continued)

(30) Foreign Application Priority Data

Aug. 12, 2011 (JP) .................................. 2011-176580

(51) Int. Cl.
*B44C 1/22* (2006.01)
*C03C 15/00* (2006.01)
(Continued)

(52) U.S. Cl.
CPC .......... *C01B 31/0226* (2013.01); *B82Y 30/00* (2013.01); *B82Y 40/00* (2013.01);
(Continued)

(58) Field of Classification Search
USPC .................................. 216/69; 977/743, 745
See application file for complete search history.

(56) References Cited

U.S. PATENT DOCUMENTS 7,641,938 B2 * 1/2010 Liu ........................ B82Y 30/00
427/249.1
2001/0050059 A1 12/2001 Hongo et al.
(Continued)

FOREIGN PATENT DOCUMENTS

JP 2001-180920 7/2001
JP 2001-262343 9/2001
(Continued)

OTHER PUBLICATIONS

International Search Report mailed Oct. 16, 2012 in PCT/JP2012/067431, filed Jul. 9, 2012 (with English Translation).

*Primary Examiner* — Roberts Culbert
(74) *Attorney, Agent, or Firm* — Oblon, McClelland, Maier & Neustadt, L.L.P.

(57) ABSTRACT

A method for processing carbon nanotubes includes positioning in a treatment chamber of a carbon nanotube processing apparatus a substrate having multiple carbon nanotubes bundled together and oriented substantially perpendicular to a surface of the substrate, and introducing a microwave into the treatment chamber from a planar antenna having multiple microwave radiation holes such that plasma of an etching gas is generated and that the plasma etches the carbon nanotubes starting from one end of the carbon nanotubes bundled together.

13 Claims, 7 Drawing Sheets

Related U.S. Application Data application No. PCT/JP2012/067431, filed on Jul. 9, 2012.

(51) Int. Cl.
- *C03C 25/68* (2006.01)
- *C23F 1/00* (2006.01)
- *C01B 31/02* (2006.01)
- *B82Y 40/00* (2011.01)
- *H01J 9/02* (2006.01)
- *C01B 31/08* (2006.01)
- *B82Y 30/00* (2011.01)

(52) U.S. Cl.
CPC ........ *C01B 31/028* (2013.01); *C01B 31/0253* (2013.01); *C01B 31/089* (2013.01); *H01J 9/025* (2013.01)

(56) References Cited

U.S. PATENT DOCUMENTS

| | | |
|---|---|---|
| 2004/0238104 A1 | 12/2004 | Suzuki et al. |
| 2005/0205015 A1 | 9/2005 | Sasaki et al. |
| 2009/0159214 A1 | 6/2009 | Kasai |
| 2009/0215274 A1 | 8/2009 | Matsumoto et al. |
| 2010/0279512 A1 | 11/2010 | Udea et al. |
| 2012/0220106 A1 | 8/2012 | Matsumoto et al. |

FOREIGN PATENT DOCUMENTS

| | | |
|---|---|---|
| JP | 2003-159700 | 6/2003 |
| JP | 2005-350342 A | 12/2005 |
| JP | 2008-100895 A | 5/2008 |
| JP | 2009-292716 | 12/2009 |
| JP | 2010-186858 A | 8/2010 |
| JP | 2011-068513 | 4/2011 |

\* cited by examiner

METHOD AND APPARATUS FOR PROCESSING CARBON NANOTUBES

CROSS-REFERENCE TO RELATED APPLICATIONS

The present application is a divisional of and claims the benefit of priority to U.S. application Ser. No. 14/176,197, filed Feb. 10, 2014, which is a continuation of PCT/JP2012/067431, filed Jul. 9, 2012, which is based upon and claims the benefit of priority to Japanese Application No. 2011-176580, filed Aug. 12, 2011. The entire contents of these applications are incorporated herein by reference.

BACKGROUND OF THE INVENTION

Field of the Invention

The present invention relates to a method and an apparatus for processing carbon nanotubes.

Description of Background Art

Carbon nanotubes have excellent electric conductivity (low electric resistance), excellent heat conductivity (high heat radiation), and high electric current density tolerance (high electromigration tolerance). For this reason, there is expectation that carbon nanotubes become a next generation wiring material for semiconductor devices and replace copper wire widely used in the art at this time. In order to use carbon nanotubes as wiring material, carbon nanotubes have a certain length, and multiple carbon nanotubes are arranged in a certain orientation. Also, to use carbon nanotubes, for example, in an electron emission element and the like utilizing field electron emission, a bundle of carbon nanotubes having a certain length is arranged with high density. However, since individual carbon nanotubes grow to various lengths during the course of their growth, the carbon nanotubes are processed to have a length appropriate to their purpose.

As a method for processing carbon nanotubes, there are a chemical mechanical polishing (CMP) method and a focused ion beam (FIB) method. For example, when CMP is employed, since dropping or peeling of carbon nanotubes may occur if they are polished directly, the polishing is performed by solidifying a bundle of carbon nanotubes using a silica-based solidification material. In such a case, the solidification material may be mixed into gaps among oriented carbon nanotubes, causing problems such as an increase in electric resistance.

As a technique of processing carbon nanotubes using a dry process, for example, JP 2001-180920 A proposes a processing method that includes a process of irradiating ions onto carbon nanotubes and an oxidization process. In addition, JP 2003-159700 A proposes a method for irradiating an electron beam at an energy level of lower than 120 keV onto carbon nanotubes. The entire contents of these publications are incorporated herein by reference. The entire contents of this publication (these publications) are incorporated herein by reference.

SUMMARY OF THE INVENTION

According to one aspect of the present invention, a method for processing carbon nanotubes includes positioning in a treatment chamber of a carbon nanotube processing apparatus a substrate having multiple carbon nanotubes bundled together and oriented substantially perpendicular to a surface of the substrate, and introducing a microwave into the treatment chamber from a planar antenna having multiple microwave radiation holes such that plasma of an etching gas is generated and that the plasma etches the carbon nanotubes starting from one end of the carbon nanotubes bundled together.

According to another aspect of the present invention, an apparatus for processing carbon nanotubes includes a treatment chamber having an opening on top and structured such that multiple carbon nanotubes bundled together on a substrate and oriented substantially perpendicular to a surface of the substrate is processed in the treatment chamber, a stage which holds the substrate in the treatment chamber, a dielectric plate which covers the opening of the treatment chamber, a planar antenna positioned on an outer-side of the dielectric plate and having multiple microwave radiation holes formed to introduce a microwave into the treatment chamber, a first gas inlet formed to introduce a processing gas into the treatment chamber, a second gas inlet formed to introduce a processing gas into the treatment chamber, and an exhaust duct connected to an exhaust device which decompresses and evacuates the treatment chamber. The first gas inlet is positioned between the dielectric plate and the second gas inlet, the second gas inlet is positioned between the first gas inlet and the stage and has multiple gas discharge ports formed to discharge a gas to the carbon nanotubes on the surface of the substrate held on the stage, and the first gas inlet and/or the second gas inlet is formed to introduce an etching gas into the treatment chamber such that the carbon nanotubes are etched.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
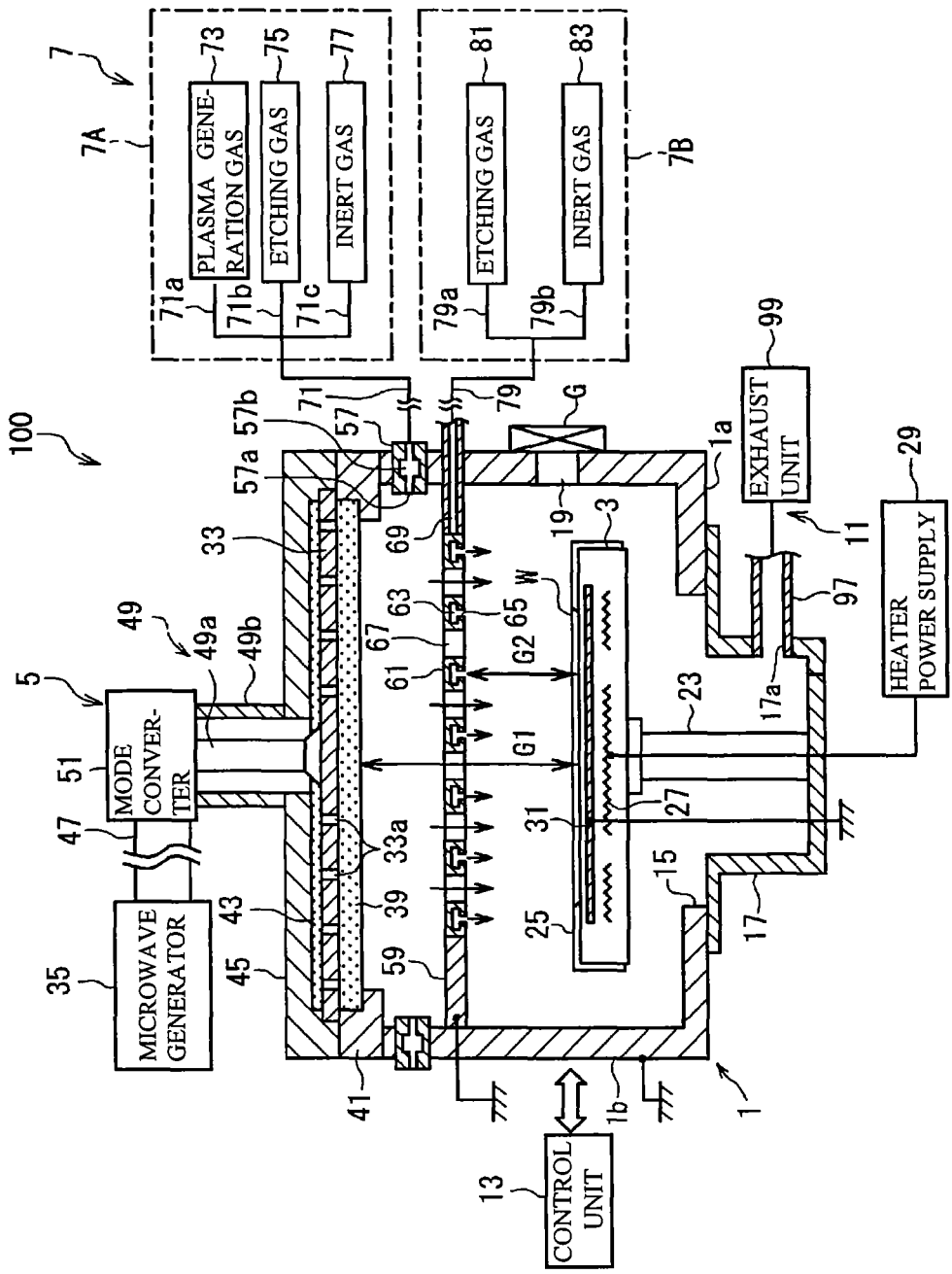
FIG. 1 is a cross-sectional view illustrating a structural example of an etching apparatus according to an embodiment of the invention.

The embodiments will now be described with reference to the accompanying drawings, wherein like reference numerals designate corresponding or identical elements throughout the various drawings.

Etching Apparatus

FIG. 1 is a cross-sectional view schematically illustrating an etching apparatus applicable to a method for processing carbon nanotubes according to an embodiment of the present invention. The etching apparatus 100 of FIG. 1 is structured to be a radial line slot antenna (RLSA) type microwave plasma treatment apparatus capable of forming homogeneous microwave plasma in a treatment chamber by radiating microwaves from multiple microwave radiation holes of a planar antenna. The microwave plasma used in the etching apparatus 100 is a low-electron-temperature plasma mainly containing radicals. Therefore, the microwave plasma is suitable for etching carbon nanotubes.

The etching apparatus 100 includes: as a main component, a substantially cylindrical treatment chamber 1; a stage 3 provided in the treatment chamber 1 to place a semiconductor wafer (hereinafter, simply referred to as a "wafer") (W), where carbon nanotubes as a treatment target are formed; a microwave inlet 5 that introduces a microwave into the treatment chamber 1; a gas supply unit 7 that introduces a gas into the treatment chamber 1; an exhaust unit 11 that evacuates the treatment chamber 1; and a control unit 13 that controls each part of the etching apparatus 100.

Treatment Chamber

The treatment chamber 1 is a substantially cylindrical chamber grounded and hermetically sealed such that vacuum evacuation can be performed. The treatment chamber 1 includes a bottom wall (1a) and a side wall (1b) made of aluminum or the like. A circular opening 15 is formed in an approximate center of the bottom wall (1a) of the treatment chamber 1. The bottom wall (1a) is provided with an exhaust chamber 17 that is connected to the opening 15 and protrudes downward. It is noted that the exhaust chamber 17 may also be set as a part of the treatment chamber 1. In addition, the side wall (1b) of the treatment chamber 1 is provided with a load/unload gate 19 for loading or unloading the wafer (W), and a gate valve (G) for opening or closing the load/unload gate 19.

Stage

The stage 3 is made of, for example, ceramics such as aluminum nitride (AlN). The stage 3 is supported by a cylindrical ceramic support member 23 extending upward from the center of the bottom of the exhaust chamber 17. The outer edge of the stage 3 is provided with a guide ring 25 for guiding the wafer (W). In addition, a lifting pin (not illustrated) for vertically moving the wafer (W) is provided inside the stage 3 so as to be capable of advancing and withdrawing relative to the top surface of the stage 3.

A resistance heater 27 is embedded inside the stage 3. As power is supplied from a heater power supply 29 to the heater 27, the stage 3 and the wafer (W) thereon can be heated. In addition, a thermocouple (not illustrated) is inserted into the stage 3, so that the heating temperature of the wafer (W) is controlled in a range of 50 to 650° C. Unless otherwise specified, the temperature of the wafer (W) means not a setting temperature of the heater 27, but rather a temperature measured by the thermocouple. In addition, an electrode 31 of substantially the same size as that of the wafer (W) is laid over the heater 27 of the stage 3. This electrode 31 is grounded.

Microwave Inlet

The microwave inlet 5 includes: a planar antenna 33 that is provided over the treatment chamber 1 and has multiple microwave radiation holes (33a); a microwave generator 35 that generates microwaves; a transmissive plate 39 as a dielectric plate; a frame-like member 41 provided in an upper part of the treatment chamber 1; a slow-wave plate 43 made of a dielectric material capable of controlling a wavelength of the microwave; and a cover member 45 that covers the planar antenna 33 and the slow-wave plate 43. In addition, the microwave inlet 5 includes a waveguide 47 and a coaxial waveguide 49 that guide the microwave generated in the microwave generator 35 to the planar antenna 33, and a mode converter 51 provided between the waveguide 47 and the coaxial waveguide 49.

The transmissive plate 39 capable of transmitting a microwave is made of a dielectric material, for example, quartz, or ceramics such as $Al_2O_3$ or AlN. The transmissive plate 39 is supported by the frame-like member 41. A gap between the transmissive plate 39 and the frame-like member 41 is hermetically sealed using a seal member (not illustrated) such as an O-ring. Therefore, the inside of the treatment chamber 1 is hermetically retained.

Figure 2:
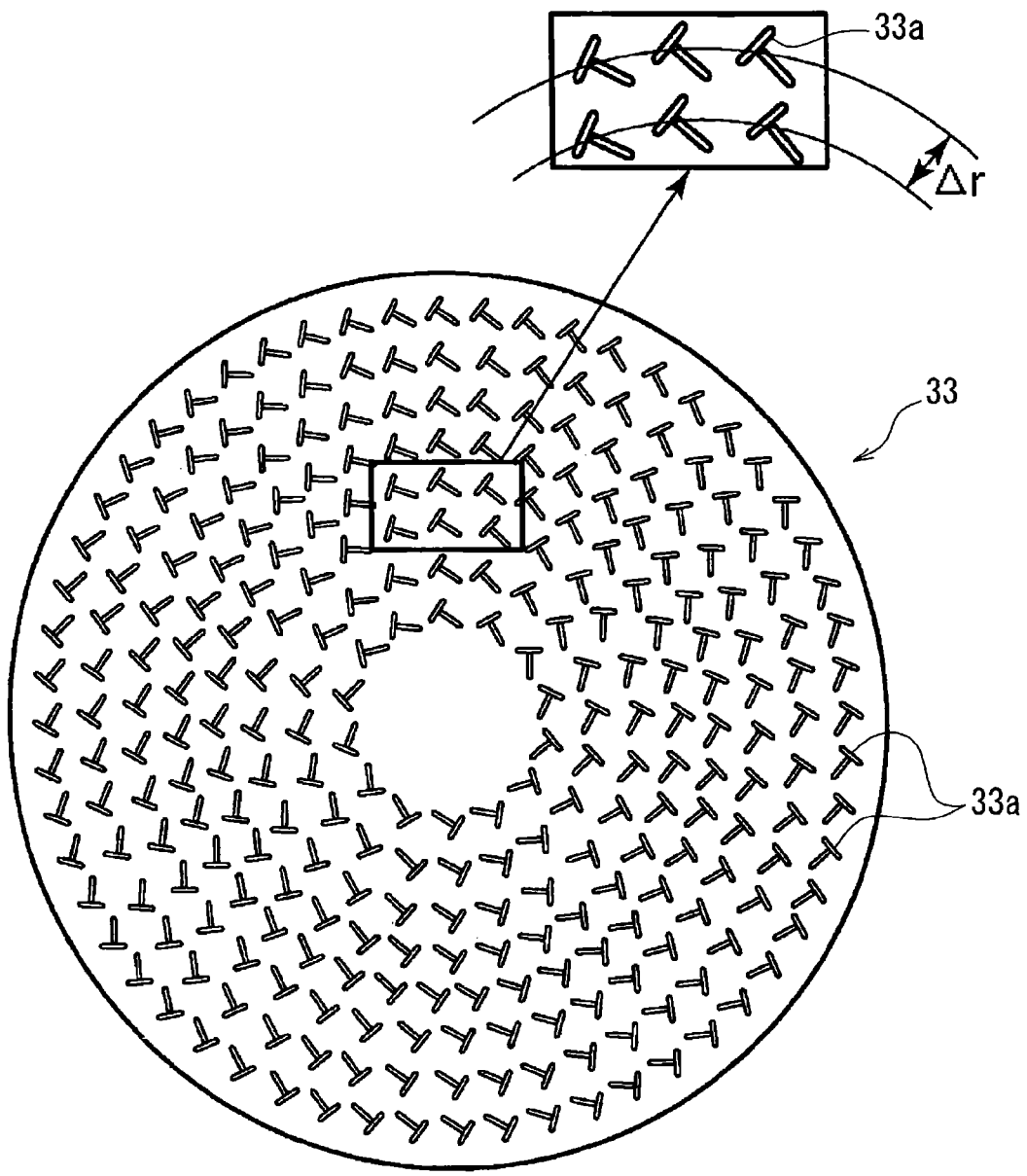
FIG. 2 is a diagram illustrating a structural example of a planar antenna of the etching apparatus of FIG. 1.

The planar antenna 33 has a disk shape, for example, and is made of a conductive member such as a gold- or silver-plated copper plate, an aluminum plate, a nickel plate, and alloys of such metals. The planar antenna 33 is set substantially parallel to the top surface of the stage 3 (a surface where a wafer (W) is placed) and positioned over the transmissive plate 39 (outside the treatment chamber 1). The planar antenna 33 is engaged with the upper end of the frame-like member 41. The planar antenna 33 has multiple rectangular (slot-like) microwave radiation holes (33a) that radiate microwaves. The microwave radiation holes (33a) are formed to penetrate through the planar antenna (33) in a predetermined pattern. Typically, as illustrated in FIG. 2, adjacent microwave radiation holes (33a) are combined in a predetermined shape (for example, T-shape) to form a pair, and all the pairs of microwave radiation holes (33a) are arranged, for example, concentrically. The length or the arrangement interval of the microwave radiation holes (33a) is determined according to a wavelength λg of the microwave in the coaxial waveguide 49. For example, the intervals between the microwave radiation holes (33a) are set in a range of λg/4~λg. In FIG. 2, the intervals between the concentrically formed adjacent microwave radiation holes (33a) are denoted as (Δr). The microwave radiation hole (33a) may have any other shape, such as a circular shape or an arc shape. Moreover, the arrangement pattern of the microwave radiation holes (33a) is not particularly limited, and the microwave radiation holes (33a) may be arranged in any other pattern, such as a helical pattern or a radial pattern.

A slow-wave plate 43 having a dielectric constant greater than that of vacuum is provided on the top surface of the planar antenna 33. Since a wavelength of the microwave increases in the vacuum, the slow-wave plate 43 has a function of controlling plasma to reduce the wavelength of the microwave. The slow-wave plate 43 may be made of, for example, quartz, polytetrafluoroethylene resin, polyimide resin, and the like.

A cover member 45 is provided to cover the planar antenna 33 and the slow-wave plate 43. The cover member 45 is made of, for example, a metal material such as aluminum or stainless steel. The coaxial waveguide 49 is connected to the center of the upper wall (ceiling) of the cover member 45. The coaxial waveguide 49 includes an internal conductor (49*a*) extending upward from the center of the planar antenna 33, and an external conductor (49*b*) provided around the internal conductor (49*a*). A mode converter 51 is provided on the other end of the coaxial waveguide 49. The mode converter 51 is connected to the microwave generator 35 through the waveguide 47. The waveguide 47 is a rectangular waveguide extending in a horizontal direction. The mode converter 51 has a function of converting a mode of the microwave propagating through the waveguide 47 from a transverse electric (TE) mode into a transverse electromagnetic (TEM) mode. Using the microwave inlet 5 having such a structure, the microwave generated from the microwave generator 35 is transmitted to the planar antenna 33 through the coaxial waveguide 49 and is then introduced into the treatment chamber 1 through the transmissive plate 39. The microwave is preferred to be set at a frequency of, for example, 2.45 GHz. The microwave may also be set at a frequency of 8.35 GHz, 1.98 GHz, or the like. In the following, a microwave set at a frequency of 2.45 GHz will be used unless otherwise specified.

Gas Supply Unit

The gas supply unit 7 includes a shower ring 57 which is set as a first gas inlet and provided in a ring shape along the inner wall of the treatment chamber 1, and a shower plate 59 which is set as a second gas inlet and provided to divide the space inside the treatment chamber 1 into upper and lower portions under the shower ring 57.

The shower ring 57 is provided on the side wall of the treatment chamber 1 at a height between the transmissive plate 39 and the shower plate 59. The shower ring 57 includes multiple gas discharge ports (57*a*) arranged in a ring shape to introduce a gas into the space of the treatment chamber 1 and a gas flow path (57*b*) connected to the gas discharge port (57*a*). The gas flow path (57*b*) is extended to the first gas supply section (7A) through the gas supply line 71. The first gas supply section (7A) has three branch pipes (71*a*, 71*b*, 71*c*) branching from the gas supply line 71. The branch pipe (71*a*) is connected to a plasma generation gas supply source 73 that supplies a plasma generation gas (such as an Ar gas). The branch pipe (71*b*) is connected to an etching gas supply source 75 that supplies an etching gas. The branch pipe (71*c*) is connected to an inert gas supply source 77 that supplies an inert gas (such as an $N_2$ gas). It is noted that the branch pipes (71*a*, 71*b*, 71*c*) are provided with a flow rate control device or valve (not illustrated).

The plasma generation gas may be, for example, a rare gas or the like. For example, a rare gas, Ar, Ne, Kr, Xe, He or the like, may be used. Among those, it is especially preferred to use Ar gas because it is capable of reliably generating plasma.

The etching gas may be, for example, an oxidizing gas or a reducing gas. Examples of oxidizing gases are $O_2$, $O_3$, $H_2O$, $H_2O_2$, NO and the like. An advantage of using an oxidizing gas for the etching gas is that a high etching rate can be obtained as described in Examples described below. An oxidizing gas is preferred, particularly when a base layer of the carbon nanotubes is made of glass, metal oxide or the like. Examples of reducing gases are $H_2$, $NH_3$ and the like. If an oxidizing etching gas is used when the base layer of carbon nanotubes are made of metal, nitride, an organic material or the like, the material of such a base layer is oxidized, and may cause lowered conductivity and decomposition or deterioration of the material. In this case, a reducing gas is preferred to be used as the etching gas. As described later in Examples, in the etching apparatus 100, low-damage etching is performed at a practically sufficient etching rate even when a reducing gas is used.

When a reducing gas is used as the etching gas, the etching rate is improved by adding a small amount of an oxidizing gas (such as $O_2$) to the reducing gas (such as an $H_2$ gas). For example, the additional amount of the oxidizing gas is preferred to be 0.001 to 3 volume %, more preferably 0.005 to 1 volume %. That is, by using a reducing gas as a main component that does not damage carbon nanotubes, and by adding a small amount of an oxidizing gas with a high reactivity, the etching rate improves while damage to carbon nanotubes is suppressed. Here, as described above, an oxidizing gas, for example, $O_2$, $O_3$, $H_2O$, $H_2O_2$, NO, or the like, may be used.

As for an inert gas, $N_2$ or the like may be used, for example. The inert gas from the inert gas supply source 77 is used as, for example, a purge gas, a pressure regulating gas or the like.

Figure 3:
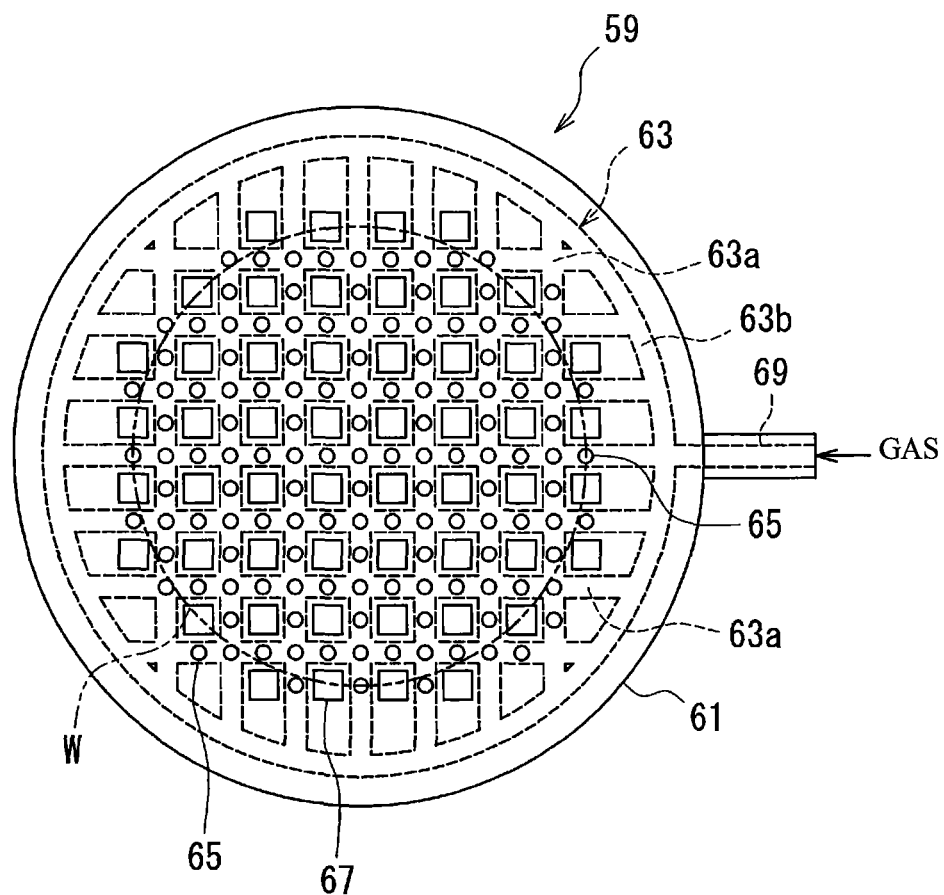
FIG. 3 is a bottom view illustrating a structural example of a shower plate of the etching apparatus of FIG. 1.

A shower plate 59 for introducing an etching treatment gas is provided horizontally between the stage 3 of the treatment chamber 1 and the microwave inlet 5. The shower plate 59 has a gas distribution member 61 formed in a planar grid shape and made of, for example, aluminum or the like. The gas distribution member 61 includes a gas flow path 63 formed inside the main body of the grid shape, and multiple gas discharge ports 65 connected to the gas flow path 63 and opened to face the stage 3. In addition, multiple through holes 67 are provided among the gas flow paths 63 arranged in a grid shape. As illustrated in FIG. 3, the gas flow path 63 includes a grid-like flow path (63*a*) and a ring-like flow path (63*b*), which is connected to and surrounds the grid-like flow path (63*a*). A gas supply path 69 reaching the wall of the treatment chamber 1 is connected to the gas flow path 63 of the shower plate 59. The gas supply path 69 is extended to the second gas supply section (7B) through the gas supply pipe 79.

The second gas supply section (7B) has a pair of branch pipes (79*a*, 79*b*) branching from the gas supply pipe 79. The branch pipe (79*a*) is connected to the etching gas supply source 81 that supplies an etching gas. The branch pipe (79*b*) is connected to the inert gas supply source 83 that supplies an inert gas. It is noted that the branch pipes (79*a*, 79*b*) are provided with a flow rate control device or a valve (not illustrated). An etching gas may include an oxidizing gas or a reducing gas as described above. As for an inert gas, $N_2$ or the like may be used, for example. The inert gas from the inert gas supply source 83 is used as, for example, a purge gas, a carrier gas or the like.

As described above, an etching gas may be introduced into the treatment chamber 1 from the first gas supply section (7A) through the shower ring 57 or may be introduced into the treatment chamber 1 from the second gas supply section (7B) through the shower plate 59. Preferably, the etching gas is introduced into the treatment chamber 1 through the shower plate 59, which is closer to the stage 3.

By introducing the etching gas as a reactive gas from the shower plate 59 to the treatment chamber 1, excessive decomposition of the etching gas caused by plasma is suppressed. Instead of ion etching using ions with strong energy, low-damage etching using a highly reactive radical is implemented. Furthermore, since strong oxidization or reduction is obtained, a high etching rate is achieved. Although not illustrated, the first gas supply section (7A) and the second gas supply section (7B) may also include another gas supply source such as a cleaning gas supply source that supplies a cleaning gas to the treatment chamber 1, in addition to the gas supply sources described above.

Exhaust Unit

The exhaust unit 11 includes an exhaust chamber 17, an exhaust duct (17a) provided on the side surface of the exhaust chamber 17, an exhaust pipe 97 connected to the exhaust duct (17a), and an exhaust device 99 connected to the exhaust pipe 97. Although not illustrated in the drawings, the exhaust device 99 includes, for example, a vacuum pump, a pressure control valve, and the like.

Control Unit

Figure 4:
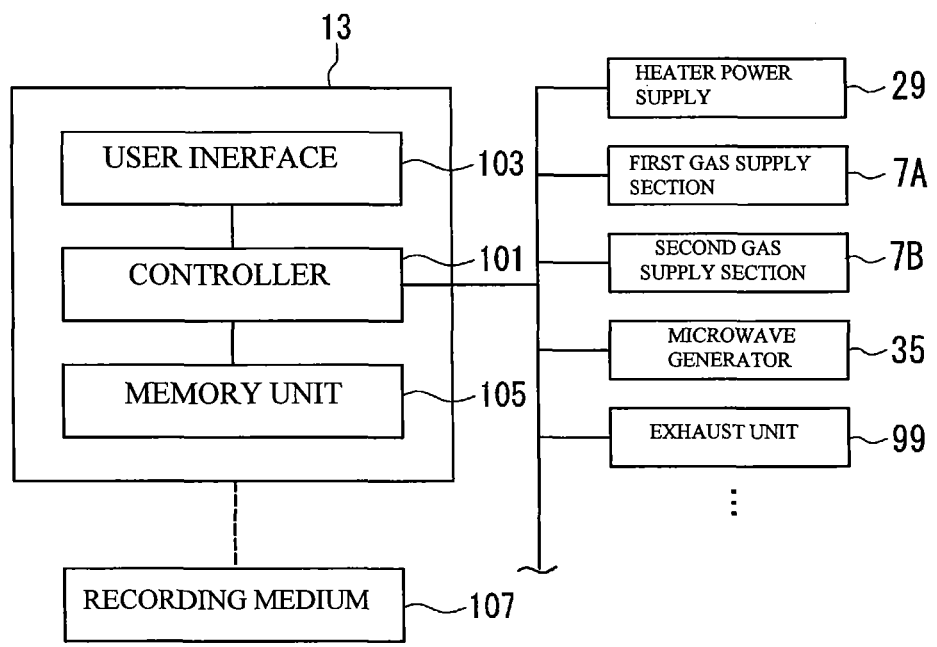
FIG. 4 is a diagram illustrating a structural example of a control unit of the etching apparatus of FIG. 1.

The control unit 13 is a module controller that controls each part of the etching apparatus 100. The control unit 13 is typically a computer. For example, as illustrated in FIG. 4, the control unit 13 includes a controller 101 having a central processing unit (CPU), and a user interface 103 and a memory portion 105 connected to the controller 101. In the etching apparatus 100, the controller 101 serves as a control means that controls each part relating to processing conditions such as temperature, pressure, gas flow rate, and microwave output power (for example, the heater power supply 29, the first gas supply section (7A), the second gas supply section (7B), the microwave generator 35, the exhaust device 99, and the like).

The user interface 103 includes a keyboard or a touch panel by which an operator inputs commands for controlling the etching apparatus 100, a display that provides a visualized operational status of the etching apparatus 100, and the like. In addition, the memory portion 105 stores a control program (software) for implementing various processes to be executed in the etching apparatus 100 under control of the controller 101, a recipe including processing condition data, and the like. In addition, by calling a desired recipe from the memory portion 105 and executing it using the controller 101 according to an instruction from the user interface 103 or the like, a desired process in the treatment chamber 1 of the etching apparatus 100 is performed under control of the controller 101. The control program or the recipe such as processing condition data may be stored in a computer-readable recording medium 107 and may be used in the stored state. Such a recording medium 107 may be, for example, a compact disc read-only memory (CD-ROM), a hard disk, a flexible disc, a flash memory, or the like. In addition, the recipe may be transmitted from another device connected, for example, via a dedicated communication line.

Method for Processing Carbon Nanotubes

Figure 5A:
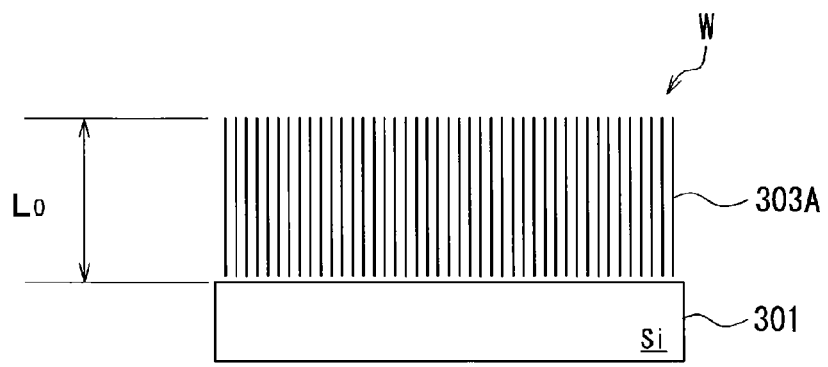
FIG. 5A is a diagram schematically illustrating a surface of a substrate where carbon nanotubes as a treatment target are formed.
Figure 5B:
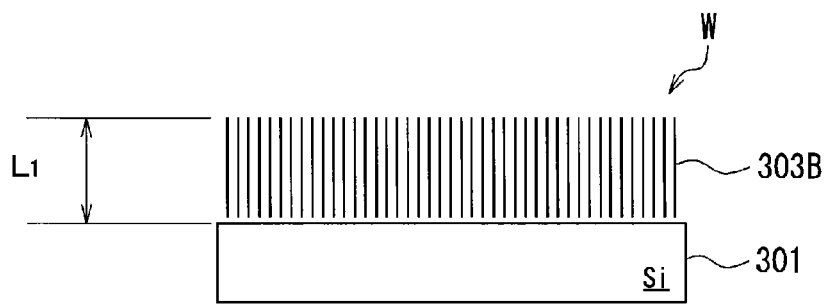
FIG. 5B is a diagram schematically illustrating a state in which the carbon nanotubes of FIG. 5A are etched.

A method for processing carbon nanotubes in the etching apparatus 100 will be described. FIGS. 5A and 5B are cross-sectional views illustrating a vicinity of the surface of the wafer (W) for describing main processes of the method for processing carbon nanotubes.

A wafer (W) where carbon nanotubes are formed is prepared. The wafer (W) is loaded into the treatment chamber 1 by opening the gate valve (G) of the etching apparatus 100 and is placed on the stage 3. Regarding the structure of the wafer (W), in the vicinity of the surface layer of the silicon substrate 301, multiple carbon nanotubes (303A) with a length ($L_0$) are formed as a high-density bundle with an orientation substantially perpendicular to the surface of the silicon substrate 301, as illustrated in FIG. 5A. It is noted that a glass substrate, a plastic (polymer) substrate or the like may also be used as a substrate instead of a semiconductor wafer (W).

The plasma generation gas (such as an Ar gas) is introduced into the treatment chamber 1 from the shower ring 57, while the microwave generated from the microwave generator 35 is guided to the planar antenna 33 via the waveguide 47 and the coaxial waveguide 49 in a predetermined mode and is introduced into the treatment chamber 1 via the microwave radiation holes (33a) of the planar antenna 33 and the transmissive plate 39. This microwave transforms the plasma generation gas (such as an Ar gas) into plasma. Here, when an oxidizing gas (such as an $O_2$ gas) is used as the etching gas, the oxidizing gas (such as an $O_2$ gas) may be introduced from the gas discharge port (57a) of the shower ring 57 or from the gas discharge port 65 of the shower plate 59 so as to be plasmatized at the time the plasma is ignited. Alternatively, when a reducing gas (such as an $H_2$ gas or an $NH_3$ gas) is used as the etching gas, the reducing gas (such as an $H_2$ gas or an $NH_3$ gas) is introduced into the treatment chamber 1 through the gas discharge port (57a) of the shower ring 57 or from the gas discharge port 65 of the shower plate 59 so as to be plasmatized at the time the plasma is ignited. The plasma formed in this way is high-density plasma having a density of, approximately, $1 \times 10^{10}$ to $5 \times 10^{13}/cm^3$ by radiating the microwave from multiple microwave radiation holes (33a) of the planar antenna 33, and in the vicinity of the wafer (W), the plasma has a low electron temperature of, approximately, 1.5 eV or lower.

Conditions of Plasma Etching

Treatment Pressure

The pressure of the treatment chamber 1 in plasma etching is preferred to be set at, for example, 66.7 to 400 Pa (0.5 to 3 Torr), more preferably at 66.7 to 266 Pa (0.5 to 2 Torr), in order to reliably maintain the plasma state.

Gas Flow Rate

When an oxidizing gas, for example, an $O_2$ gas, is used as the etching gas, a gas flow rate is preferred to be set at, for example, 100 to 2000 mL/min(sccm), more preferably at 100 to 500 mL/min(sccm), in order to efficiently generate an active species from the plasma. Alternatively, when an $H_2O$ gas is used as the oxidizing gas, a gas flow rate is preferred to be set at, for example, 0.01 to 10 mL/min(sccm), more preferably at 0.01 to 3 mL/min(sccm), in order to efficiently generate an active species from the plasma.

When a reducing gas, for example, an $H_2$ gas or an $NH_3$ gas, is used as the etching gas, the gas flow rate is preferred to be set at, for example, 100 to 2000 mL/min(sccm), more preferably at 100 to 500 mL/min(sccm), in order to efficiently generate an active species from the plasma.

When an Ar gas is used as the plasma generation gas, the gas flow rate is preferred to be set at, for example, 100 to 2000 mL/min(sccm), more preferably at 300 to 1000 mL/min(sccm), in order to reliably generate the plasma in the treatment chamber 1 and improve the efficiency of generating an active species from the plasma.

Microwave Power

The microwave power is preferred to be set at, for example, 500 to 4000 W, more preferably at 500 to 2000 W, in order to efficiently generate an active species from the plasma. In addition, a power density of the microwave is preferred to be set at 0.3 to 3.2 W/cm², more preferably at 0.3 to 1.6 W/cm², in order to efficiently generate an active species from the plasma. It is noted that the power density of the microwave refers to microwave power supplied per unit area (1 cm$^2$) of the transmissive plate 39 (the same applies in the following description).

In the treatment chamber 1, a gap (G1) from the bottom surface of the transmissive plate 39 to the top surface of the stage 3 where the wafer (W) is placed is preferred to be set at 140 to 200 mm, more preferably at 160 to 185 mm, in order to suppress damage to carbon nanotubes by sufficiently lowering the electron temperature of plasma in the vicinity of the wafer (W). In this case, a gap (G$_2$) from the lower end of the shower plate 59 (opening position of the gas discharge port 65) to the top surface of the stage 3 where the wafer (W) is placed is preferred to be set at no smaller than 80 mm, more preferably at no smaller than 100 mm, in order to suppress ion irradiation to carbon nanotubes on the surface of the wafer (W) and to perform low-damage etching mainly using radicals.

As a treatment temperature of the plasma etching process, the temperature of the wafer (W) is preferred to be set at, for example, 20 to 500° C., more preferably at 20 to 250° C. In order to increase the etching rate, the temperature of the wafer (W) is preferred to be set at no lower than 100° C.

A treatment time may be set appropriate to a desired etching amount. For example, the treatment time is preferred to be set at, for example, 5 to 30 minutes.

The plasma of an oxidizing gas or the plasma of a reducing gas generated as described above is applied to the carbon nanotubes (303A) on the wafer (W) so that etching is performed from the top-end side of the carbon nanotubes (303A) toward the base-end side along an orientation direction (that is, a longitudinal direction of the carbon nanotubes 303A). Accordingly, the carbon nanotubes (303B) are obtained with the length (L$_1$) reduced from the length (L$_0$) as illustrated in FIG. 5B. In the etching apparatus 100, plasma is generated substantially uniformly in the treatment chamber 1. Therefore, etching of the carbon nanotubes (303A) is progressed at a constant rate on a plane of the wafer (W) (in a planar direction), and the carbon nanotubes are processed to have the top ends of the carbon nanotubes (303B) located substantially on the same plane after the etching. In addition, in the RLSA type etching apparatus 100, mild plasma having a low electron temperature is used. Therefore, damage is less likely to be observed in a side portion, a base-end portion and a base layer of the carbon nanotube (303B).

After the etching, first, the supply of microwaves stops, and the supply of the plasma generation gas and the etching gas (oxidizing gas or reducing gas) is turned off. Then, the pressure of the treatment chamber 1 is adjusted, and the gate valve (G) is opened, so that the wafer (W) is unloaded.

FIGS. 5A and 5B show an example where carbon nanotubes (303A, 303B) are formed on the entire surface of the silicon substrate 301. However, etching may be performed on the carbon nanotubes (303A) formed in a predetermined pattern. In addition, in the processing method according to the present embodiment, the carbon nanotubes (303A or 303B) may be patterned by performing etching using an appropriate etching mask until the length of the exposed portion of the carbon nanotubes is reduced to zero.

In the method according to the present embodiment, the carbon nanotubes (303B) are processed such that their top ends are positioned substantially on the same plane. The carbon nanotubes (303B) processed in the method according to the present embodiment can be used, for example, in an electron emission element or a carbon nanotube illumination device.

Furthermore, the carbon nanotubes (303B) can be used, for example, in via wiring of a semiconductor device and the like. In particular, because of uniform length, high orientation, and less damage to the side or base-end portion, the carbon nanotubes (303B) are highly valued when applied to an electron emission element whose electrons are discharged in a certain direction from the top ends of the carbon nanotubes (303B).

Embodiments according to the present invention will be further described below with reference to examples. However, the present invention is not limited to such examples. It is noted that carbon nanotubes as an etching target in experiments were formed through a catalytic activation process, a purge process and a growing process based on a plasma CVD method under the following conditions. Here, Fe was used as a catalyst.

Conditions of Catalytic Activation Process
    treatment pressure: 66.7 Pa (0.5 Torr)
    treatment gas:
    H$_2$ gas of 462 mL/min(sccm)
    Ar gas of 450 mL/min(sccm)
    microwave power: 1 kW
    treatment temperature: 470° C.
    treatment time: 5 min A purge process was performed using an N$_2$ gas between the activation process and the carbon nanotube formation process.

Conditions of Purge Process
    treatment pressure: 400 Pa (3 Torr)
    treatment gas:
    N$_2$ gas of 200 mL/min(sccm)
    Ar gas of 450 mL/min(sccm)
    treatment temperature: 470° C.
    treatment time: 3 min Conditions of Forming Carbon Nanotubes
    treatment pressure: 400 Pa (3 Torr)
    treatment gas:
    C$_2$H$_4$ gas of 30 mL/min(sccm)
    H$_2$ gas of 1109 mL/min(sccm)
    Ar gas of 450 mL/min(sccm)
    microwave power: 1 kW
    treatment temperature: 470° C.
    treatment time: 30 min In the following examples, etching of carbon nanotubes was performed using an etching apparatus having the same structure as that of the etching apparatus 100 shown in FIG. 1. In this apparatus, a gap (G1) from the bottom surface of the transmissive plate 39 to the top surface of the stage 3 where the wafer (W) is placed was set at 170 mm, and a gap (G$_2$) from the lower end of the shower plate 59 (opening position of the gas discharge port 65) to the top surface of the stage 3 where the wafer (W) is placed was set at 109 mm.

Examples 1 to 3

Figure 6A:
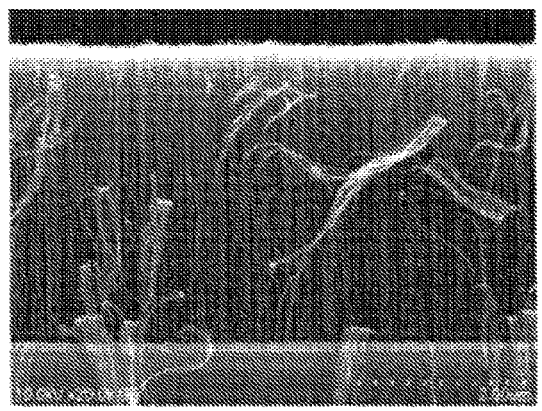
FIG. 6A is a scanning electron microscope (SEM) image of a substrate cross section illustrating a state of carbon nanotubes before etching in Examples 1 to 3.
Figure 6B:
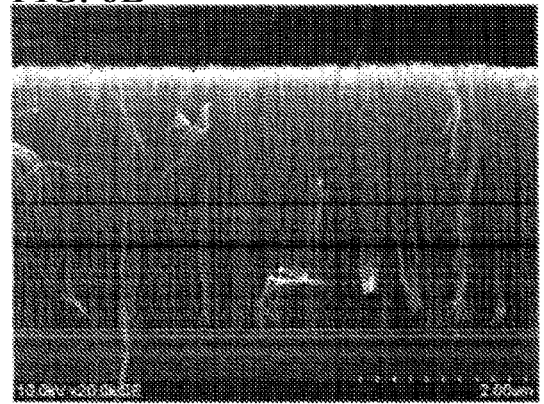
FIG. 6B is an SEM image of a substrate cross section illustrating a state of the carbon nanotubes after $O_2$ plasma etching in Example 1.
Figure 6C:
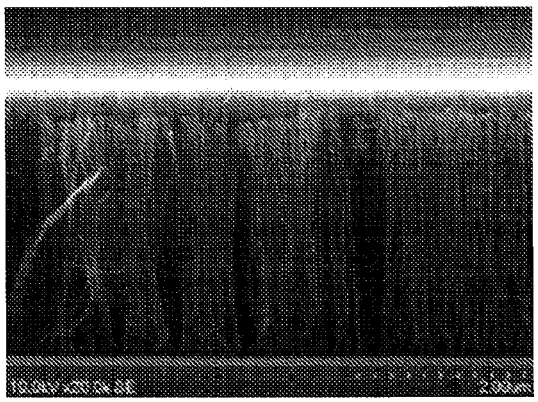
FIG. 6C is an SEM image of a substrate cross section illustrating a state of the carbon nanotubes after $NH_3$ plasma etching in Example 2.
Figure 6D:
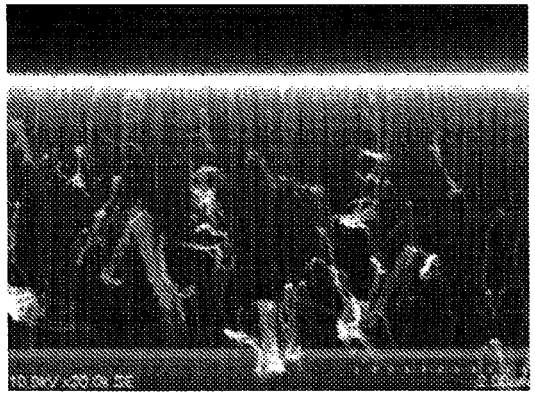
FIG. 6D is an SEM image of a substrate cross section illustrating a state of the carbon nanotubes after $H_2$ plasma etching in Example 3.

On carbon nanotubes structured the same as shown in FIG. 5A, etching was performed using O$_2$ plasma (Example 1), NH$_3$ plasma (Example 2), or H$_2$ plasma (Example 3) under the conditions of Table 1 described below. In this experiment, an O$_2$ gas as the etching gas was introduced from the shower ring 57, and an NH$_3$ gas and an H$_2$ gas were introduced from the shower plate 59. Damage to the carbon nanotubes after the etching was checked by observing a cross section obtained through a scanning electron microscope (SEM) method. The evaluation results of the etching rate and presence of the etching damage are shown in Table 1. In addition, FIG. 6A shows a test result obtained before the etching using the SEM method. FIG. 6B shows an observation result obtained after the etching using $O_2$ plasma in Example 1. FIG. 6C shows an observation result obtained after the etching using $NH_3$ plasma in Example 2. FIG. 6D shows an observation result obtained after the etching using $H_2$ plasma in Example 3. As shown in Table 1, it is found that the etching rate is highest when etching is performed using $O_2$ plasma. However, it is also found that a sufficient etching rate for practical use is obtained even when $NH_3$ plasma or $H_2$ plasma is used.

TABLE 1

| ETCHING CONDITIONS | Example 1 $O_2$ plasma | Example 2 $NH_3$ plasma | Example 3 $H_2$ plasma |
|---|---|---|---|
| treaetment pressure [Pa] | 133.3 | 133.3 | 133.3 |
| Ar gas [mL/min] | 450 | 450 | 450 |
| $O_2$ gas [mL/min] | 100 | — | — |
| $NH_3$ gas [mL/min] | — | 100 | — |
| $H_2$ gas [mL/min] | — | — | 462 |
| microwave power [kW] | 1 | 1 | 1 |
| temperature [° C.] | 25 | 25 | 25 |
| time [min] | 5 | 5 | 5 |
| <EVALUATION> | | | |
| initial length ($L_0$) [μm] | 3.5 | 3.5 | 3.5 |
| length ($L_1$) [μm] after etching | 3.1 | 3.2 | 3.3 |
| etching rate [nm/min] | 80 | 60 | 40 |
| damage on side portion | none | none | none |
| damage on base-side portion | none | none | none |

Figure 7:
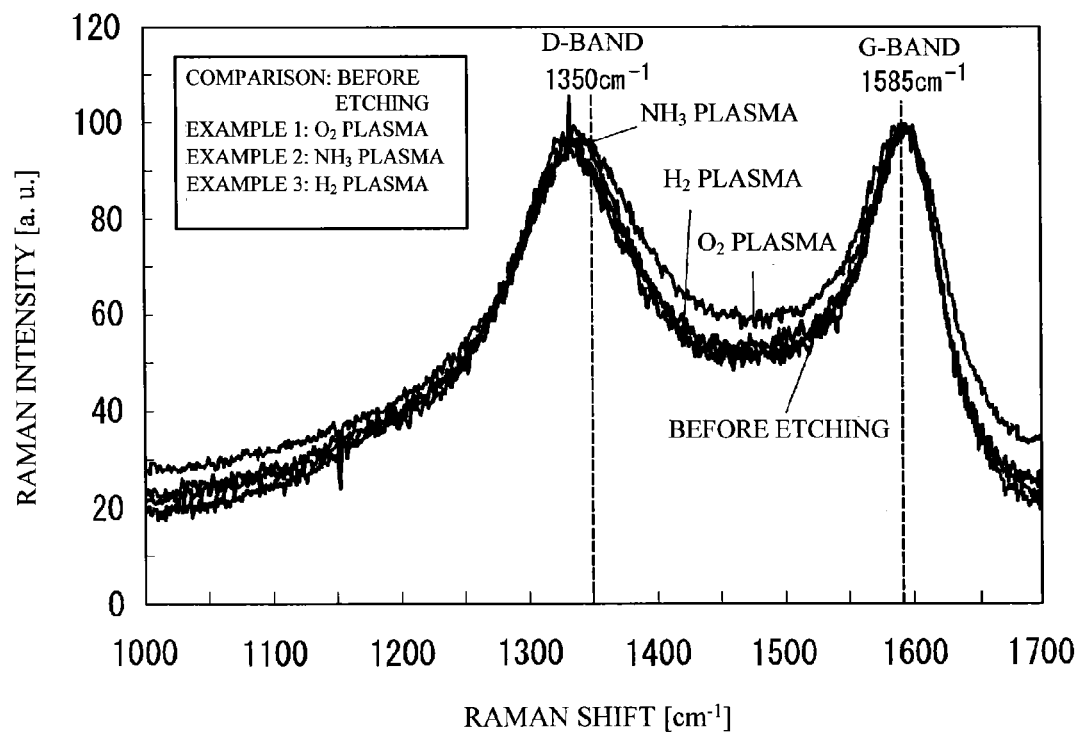
FIG. 7 is a graph illustrating measurement results of crystallinity of the carbon nanotubes before and after etching in Examples 1 to 3 using a Raman scattering spectroscopy method.

For crystallinity of the carbon nanotube after etching in Examples 1 to 3, evaluation was performed based on a Raman scattering spectroscopy method. A Raman spectrum chart is shown in FIG. 7. Referring to FIG. 7, it is found that a peak of a D-band in the vicinity of 1,350 $cm^{-1}$ does not change before and after the etching, and a ratio between G-band and D-band intensities (G/D ratio) does not change. Therefore, it is found that crystallinity before etching is maintained even after etching, and no damage caused by processing was observed. It is noted that the G/D ratio before the etching was 1.07, the G/D ratio after the etching using $O_2$ plasma in Example 1 was 1.05, the G/D ratio after the etching using $NH_3$ plasma in Example 2 was 0.97, and the G/D ratio after the etching using $H_2$ plasma in Example 3 was 1.05.

Examples 4 and 5

Figure 8A:
FIG. 8A is an SEM image of a substrate cross section illustrating a state of carbon nanotubes after $H_2$ plasma etching in Example 4.
Figure 8B:
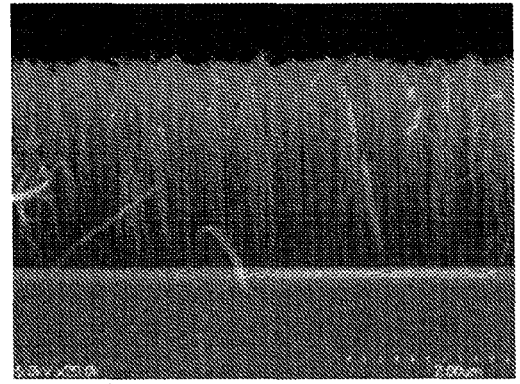
FIG. 8B is an SEM image of a substrate cross section illustrating a state of carbon nanotubes after $H_2/O_2$ plasma etching in Example 5.

On carbon nanotubes with the same structure as shown in FIG. 5A, etching was performed using $H_2$ plasma (Example 4) or $H_2/O_2$ plasma (Example 5) under the conditions of Table 2 described below. In this experiment, an $O_2$ gas as the etching gas was introduced from the shower ring 57, and an $H_2$ gas was introduced from the shower plate 59. FIG. 8A shows an observation result obtained after the etching using $H_2$ plasma in Example 4 through SEM, and FIG. 8B shows an observation result obtained after the etching using $H_2/O_2$ plasma. Comparing Examples 4 and 5 shown in Table 2, it is found that damage to the carbon nanotubes is suppressed and the etching rate of the carbon nanotubes is significantly improved by adding a small amount of oxygen to an $H_2$ gas.

TABLE 2

| ETCHING CONDITIONS | Example 4 $H_2$ plasma | Example 5 $H_2/O_2$ plasma |
|---|---|---|
| treaetment pressure [Pa] | 133.3 | 133.3 |
| Ar gas [mL/min] | 450 | 450 |
| $O_2$ gas [mL/min] | — | 0.1 |
| $H_2$ gas [mL/min] | 462 | 462 |
| microwave power [kW] | 1 | 1 |
| temperature [° C.] | 270 | 270 |
| time [min] | 15 | 15 |
| <EVALUATION> | | |
| initial length ($L_0$) [μm] | 3.5 | 3.5 |
| length ($L_1$) [μm] after etching | 3.3 | 2.0 |
| etching rate [nm/min] | 13 | 100 |

Example 6

On the carbon nanotubes with the same structure as shown in FIG. 5A, etching was performed using $H_2O$ plasma under the same conditions. It is noted that an $H_2O$ gas as the etching gas was introduced from the shower plate 59 along with an argon gas.

Figure 9A:
FIG. 9A is an SEM image of a substrate cross section illustrating a state of carbon nanotubes before etching in Example 6.
Figure 9B:
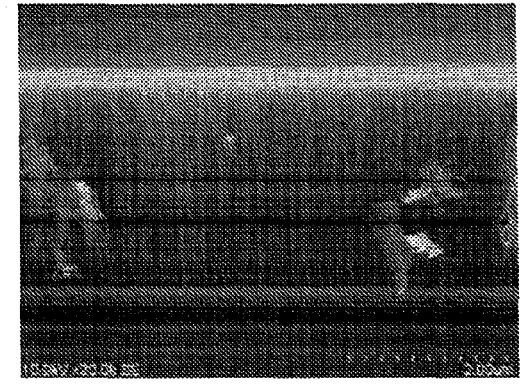
FIG. 9B is an SEM image of a substrate cross section illustrating a state of the carbon nanotubes after $H_2O$ plasma etching in Example 6.

Etching Conditions
   treatment pressure: 133.3 Pa
   flow rate of Ar gas: 100 mL/min(sccm)
   flow rate of $H_2O$ gas: 0.03 mL/min(sccm)
   microwave power: 1 kW
   temperature [° C.]: 470° C.
   time [minute]: 5 min FIG. 9A shows an observation result obtained before etching through an SEM method. FIG. 9B shows an observation result obtained after etching using $H_2O$ plasma in Example 6. An initial length ($L_0$) of carbon nanotubes shown in FIG. 9A was 3.2 μm, and after the etching, the length ($L_1$) of the carbon nanotubes shown in FIG. 9B was 2.6 μm. In addition, the etching rate was 120 nm/min.

From the observation results described above, it is found that, by using the RLSA type microwave plasma-based etching apparatus 100, the high-density carbon nanotubes with an orientation substantially perpendicular to a substrate surface are processed into the carbon nanotubes with a uniform length by performing etching while minimizing damage.

As described above, according to the method for processing carbon nanotubes of the present embodiment, by etching a bundle of carbon nanotubes with an orientation substantially perpendicular to a substrate surface from the top-end side, a bundle of carbon nanotubes are processed to have a uniform length. In the method for processing carbon nanotubes according to the present embodiment, plasma of the etching gas generated by introducing a microwave into the treatment chamber using the planar antenna having multiple holes is used. Therefore, when carbon nanotubes are processed, a side portion or a base-end portion of the carbon nanotubes is hardly damaged by plasma.

Figure 10:
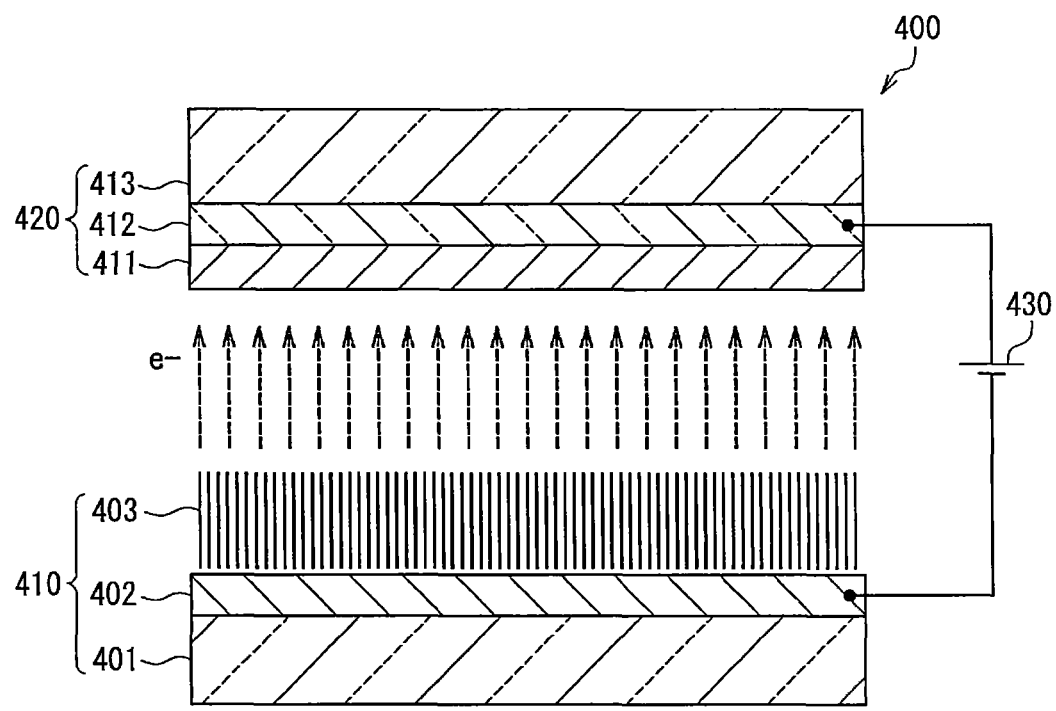
FIG. 10 is a diagram schematically illustrating a structure of a carbon nanotube illumination device.

Application to Electron Emission Element and Carbon Nanotube Illumination Device Next, a description will be given for application examples of carbon nanotubes processed using a processing method according to an embodiment of the present invention by referring to electron emission elements and carbon nanotube illumination devices. FIG. 10 schematically illustrates the structure of a carbon nanotube illumination device 400 obtained by applying the carbon nanotubes to an electron emission element. The carbon nanotube illumination device 400 includes an emitter portion 410 having a cathode substrate 401, a cathode 402, and a bundle of carbon nanotubes 403, a fluorescent layer (white) 411, a light-emitting portion 420 having an anode 412 and an anode substrate 413, and an external power supply 430 that applies voltage between the cathode 402 and the anode 412. Here, the cathode 402 and the carbon nanotubes 403 of the emitter portion 410 are electrically connected to each other. In addition, the cathode 402 and the carbon nanotubes 403 are included in the electron emission element.

Emitter Portion

The emitter portion 410 has a structure obtained by stacking a cathode substrate 401, a cathode 402, and a bundle of carbon nanotubes processed according to the processing method described above. Although not illustrated in the drawings, a catalytic metal layer including a metal such as Fe, Ni, and Co, a metal oxide or a metal nitride may be provided between the cathode 402 and the carbon nanotube 403. The catalytic metal layer may be used when the carbon nanotubes 403 are grown, and may be provided as part of the cathode 402. The cathode substrate 401 tolerates heating, for example, in a temperature range of 100 to 350° C. For example, a silicon substrate, a glass substrate, or a polymer resin (polymer) substrate may be used. In addition, any conductive material may be used as a material of the cathode 402. For example, copper, aluminum, nickel, steel, stainless steel or the like may be used. Among those, aluminum is preferred because of its high reflectance of ultraviolet light, visible light and infrared light and its low cost. A thickness of the cathode 402 is preferred to be set at, for example, 1 to 10 µm.

Light-Emitting Portion

A light-emitting portion 420 has a structure obtained by stacking a (white) fluorescent layer 411, an anode 412 and an anode substrate 413, and by using a surface of the anode substrate 413 as a light-emitting surface. The fluorescent layer 411 is stacked on the anode 412 to face the carbon nanotube 403 and emits light by receiving electrons discharged from the electron emission element. A fluorescent body used in the fluorescent layer 411 may be appropriately selected depending on emission wavelength or field of use. The fluorescent body may include, for example, fine particles of zinc oxide, titanium oxide, aluminum oxide, yttrium oxide, or the like. The fluorescent layer 411 may be formed, for example, through a coating method, an inkjet method, a screen-printing method, or the like. The anode 412 is arranged to face the electron emission element that includes the cathode 402 and the carbon nanotube 403. As long as it is a transparent conductive material layer, any material may be selected for the anode 412. For example, a material of the anode 412 may be indium tin oxide (ITO), graphene, zinc oxide, tin oxide, or the like. The anode 412 may be formed on the anode substrate 413 through various methods such as a sputtering method, a vacuum deposition method, an ion plating method, a CVD method, a spray method, and a dipping method. As long as it is made of a light-transmitting material, any material for the anode substrate 413 may be selected. For example, the anode substrate 413 may include a glass substrate or a synthetic resin (polymer) substrate such as an acryl resin or a polycarbonate resin.

The carbon nanotube illumination device 400 is installed in, for example, a vacuum-evacuated casing (not illustrated) in order to maintain a gap between the cathode 402 and the anode 412 in vacuum.

In the carbon nanotube illumination device 400 having such a structure, voltage is applied using an external power supply 430 between the cathode 402 of the emitter portion 410 and the anode 412 of the light-emitting portion 420. As a result, electrons e are discharged from the top-end portions of the carbon nanotubes 403 through field electron emission, and the discharged electrons enter the fluorescent layer 411 to generate light. This light is transmitted through the anode 412 and the anode substrate 413 and is irradiated from the surface of the anode substrate 413 to the outside.

The manufacturing of the carbon nanotube illumination device 400 and the electron emission element illustrated in FIG. 10 may include, for example, Process A and Process B described below.

Process A

A stack structure including the cathode substrate 401, the cathode 402, and a bundle of carbon nanotubes 403 is arranged on the stage 3 of the etching apparatus 100.

Process B

The microwave is introduced into the treatment chamber 1 using the planar antenna 33 having multiple microwave radiation holes (33a), plasma of the etching gas (the oxidizing gas or the reducing gas) is generated, and etching is performed on a bundle of carbon nanotubes using the plasma starting from the top-end side.

The carbon nanotube illumination device 400 is provided with a bundle of high-density carbon nanotubes 403 that are oriented substantially perpendicular to the cathode 402 and the anode 412, have uniform top-end positions of the same length, and show hardly any damage. Therefore, uniform and high-efficient field emission is achieved. Accordingly, because of high field emission effects, an illumination device is processed to operate at low voltage and low power consumption with low heat radiation. The carbon nanotube illumination device 400 may be employed in various fields. For example, the carbon nanotube illumination device 400 may be employed in general interior or exterior illumination, large-scale illumination equipment in a factory such as a vegetable plant, displays such as a liquid crystal backlight or an LED display light source, sensor applications such as an infrared sensor light source or an industrial sensor light source, signaling applications such as a traffic light or an emergency light, and a medical light source for an endoscope or the like. In addition, the electron emission element having carbon nanotubes processed according to the processing method of the above embodiment is not limited to being applied to the aforementioned illumination devices, but may also be employed in various applications as a field electron emission element that discharges electrons by a strong electric field. For example, the electron emission element described above may be employed as an electron generation source in an optical printer, an electron microscope, an electron beam exposure apparatus, and the like, or in an electron beam gun, an electron source of a field emitter array of a flat panel display, and the like.

While embodiments of the present invention have been described in detail for illustrative purposes, it should be noted that the present invention is not limited to the embodiments described above, and various changes or modifications can be made. For example, in the embodiments above, the method for processing carbon nanotubes was applied to manufacturing a carbon nanotube illumination device and the electron emission element. However, a method for processing carbon nanotubes according to an embodiment of the present invention may also be applied to, for example, processing of carbon nanotubes as via wiring of a semiconductor.

According to one aspect of the present invention, there is provided a method for performing low-damage etching on high-density carbon nanotubes oriented substantially perpendicular to a surface of a substrate so as to obtain carbon nanotubes of a uniform length.

A method for processing carbon nanotubes according to such an aspect of the present invention includes a process of arranging a substrate having a bundle of carbon nanotubes oriented substantially perpendicular to a surface of the substrate in a treatment chamber of a carbon nanotube processing apparatus; and a process of introducing a microwave into the treatment chamber using a planar antenna having multiple microwave radiation holes such that plasma of an etching gas is generated, and a bundle of the carbon nanotubes are etched using the plasma starting from a top-end side.

In the method for processing carbon nanotubes according to such an aspect of the present invention, the planar antenna may be a radial line slot antenna.

In the method for processing carbon nanotubes according to such an aspect of the present invention, the etching gas may be an oxidizing gas. In this case, the oxidizing gas is preferred to include one or more gases from a group of an $O_2$ gas, an $O_3$ gas, an $H_2O$ gas, an $H_2O_2$ gas, and an NO gas.

In the method for processing carbon nanotubes according to such an aspect of the present invention, the etching gas may be a reducing gas. The reducing gas is preferred to include one or more gas from a group of an $H_2$ gas and an $NH_3$ gas. In addition, an oxidizing gas of 0.001 to 3 volume % is preferred to be added to the reducing gas. In this case, the added oxidizing gas is preferred to include one or more gas from a group of an $O_2$ gas, an $O_3$ gas, an $H_2O$ gas, an $H_2O_2$ gas, and an NO gas.

In the method for processing carbon nanotubes according to such an aspect of the present invention, the etching process may be performed by introducing a plasma generation gas into the treatment chamber along with the etching gas to generate plasma.

In the method for processing carbon nanotubes according to such an aspect of the present invention, the etching process may be performed by setting the pressure of the treatment chamber at 66.7 to 400 Pa.

In the method for processing carbon nanotubes according to such an aspect of the present invention, the etching process may be performed by setting the power of the microwave at 500 to 4000 W.

In the method for processing carbon nanotubes according to such an aspect of the present invention, the carbon nanotube processing apparatus may include: a treatment chamber that has an opening on top and performs treatment on the substrate; a stage where the substrate is placed in the treatment chamber; a dielectric plate that covers the opening of the treatment chamber, the planar antenna provided on an outer side of the dielectric plate and has multiple microwave radiation holes structured to introduce the microwave into the treatment chamber; a first gas inlet structured to introduce a treatment gas into the treatment chamber; a second gas inlet structured to introduce a treatment gas into the treatment chamber; and an exhaust duct connected to an exhaust unit structured to decompress and evacuate the treatment chamber. In addition, in the carbon nanotube processing apparatus, the first gas inlet may be provided between the dielectric plate and the second gas inlet, and the second gas inlet may be provided between the first gas inlet and the stage and have multiple gas discharge ports structured to discharge a gas toward the carbon nanotube on the surface of the substrate placed on the stage. Furthermore, in the method for processing carbon nanotubes according to such an aspect of the present invention, the etching gas may be introduced into the treatment chamber from one or both of the first and second gas inlets to perform etching on the carbon nanotube. In this case, the etching process is preferred to be performed by setting a length from a bottom surface of the dielectric plate to a top surface of the stage at 140 to 200 mm and setting a distance from a lower end of the second gas inlet to the top surface of the stage to be no shorter than 80 mm.

According to another aspect of the present invention, there is provided a carbon nanotube processing apparatus including: a treatment chamber that has an opening on top and performs treatment on a substrate having a bundle of carbon nanotubes oriented substantially perpendicular to a surface; a stage where the substrate is placed in the treatment chamber; a dielectric plate that covers the opening of the treatment chamber; a planar antenna that is provided on an outer side of the dielectric plate and has multiple microwave radiation holes structured to introduce a microwave into the treatment chamber; a first gas inlet structured to introduce a treatment gas into the treatment chamber; a second gas inlet structured to introduce a treatment gas into the treatment chamber; and an exhaust duct connected to an exhaust unit structured to decompress and evacuate the treatment chamber. In the carbon nanotube processing apparatus, the first gas inlet is provided between the dielectric plate and the second gas inlet, the gas inlet is provided between the first gas inlet and the stage and has multiple gas discharge ports structured to discharge a gas toward the carbon nanotube on the surface of the substrate placed on the stage; and the etching gas is introduced into the treatment chamber from one or both of the first and second gas inlets to perform etching on the carbon nanotubes. In this case, a length from a bottom surface of the dielectric plate to a top surface of the stage may be set at 140 to 200 mm, and a distance from a lower end of the second gas inlet to the top surface of the stage may be set at 80 mm or longer.

Obviously, numerous modifications and variations of the present invention are possible in light of the above teachings. It is therefore to be understood that within the scope of the appended claims, the invention may be practiced otherwise than as specifically described herein.

What is claimed is:

1. A method for processing carbon nanotubes, comprising:
    positioning in a treatment chamber of a carbon nanotube processing apparatus a substrate having a plurality of carbon nanotubes bundled together and oriented substantially perpendicular to a surface of the substrate; and
    introducing a microwave into the treatment chamber from a planar antenna having a plurality of microwave radiation holes such that plasma of an etching gas is generated and that the plasma etches the carbon nanotubes starting from one end of the carbon nanotubes bundled together.

2. The method for processing carbon nanotubes according to claim 1, wherein the planar antenna is a radial line slot antenna.

3. The method for processing carbon nanotubes according to claim 1, wherein the etching gas is an oxidizing gas.

4. The method for processing carbon nanotubes according to claim 3, wherein the oxidizing gas is at least one gas selected from the group consisting of $O_2$ gas, $O_3$ gas, $H_2O$ gas, $H_2O_2$ gas and NO gas.

5. The method for processing carbon nanotubes according to claim 1, wherein the etching gas is a reducing gas.

6. The method for processing carbon nanotubes according to claim 5, wherein the reducing gas is at least one gas selected from the group consisting of $H_2$ gas and $NH_3$ gas.

7. The method for processing carbon nanotubes according to claim 6, further comprising adding an oxidizing gas in an amount in a range of 0.001 volume % to 3 volume % with respect to the reducing gas.

8. The method for processing carbon nanotubes according to claim 7, wherein the oxidizing gas is at least one gas selected from the group consisting of $O_2$ gas, $O_3$ gas, $H_2O$ gas, $H_2O_2$ gas and NO gas.

9. The method for processing carbon nanotubes according to claim 1, wherein the introducing of the microwave comprises introducing a plasma generating gas together with the etching gas into the treatment chamber such that the plasma is generated.

10. The method for processing carbon nanotubes according to claim 1, wherein the introducing of the microwave comprises maintaining a pressure in the treatment chamber in a range of 66.7 Pa to 400 Pa.

11. The method for processing carbon nanotubes according to claim 1, wherein the introducing of the microwave comprises introducing the microwave having a power in a range of 500 W to 4000 W.

12. The method for processing carbon nanotubes according to claim 1, wherein the carbon nanotube processing apparatus has a treatment chamber having an opening on top and configured such that the plurality of carbon nanotubes on the substrate is processed in the treatment chamber, a stage configured to hold the substrate in the treatment chamber, a dielectric plate configured to cover the opening of the treatment chamber, a planar antenna positioned on an outer-side of the dielectric plate and having a plurality of microwave radiation holes configured to introduce the microwave into the treatment chamber, a first gas inlet configured to introduce a processing gas into the treatment chamber, a second gas inlet configured to introduce a processing gas into the treatment chamber, and an exhaust duct connected to an exhaust device configured to decompress and evacuate the treatment chamber, the first gas inlet is positioned between the dielectric plate and the second gas inlet, the second gas inlet is positioned between the first gas inlet and the stage and has a plurality of gas discharge ports configured to discharge a gas to the carbon nanotubes on the surface of the substrate held on the stage, and at least one of the first gas inlet and the second gas inlet is configured to introduce the etching gas into the treatment chamber such that the plurality of carbon nanotubes is etched.

13. The method for processing carbon nanotubes according to claim 12, wherein the introducing of the microwave comprises setting the dielectric plate and the stage such that a distance between a lower surface of the dielectric plate and an upper surface of the stage is in a range of 140 mm to 200 mm and setting the second gas inlet and the stage such that a distance between a lower end of the second gas inlet and the upper surface of the stage is 80 mm or more.

* * * * *